United States Patent
Yamaguchi et al.

(10) Patent No.: US 7,280,763 B2
(45) Date of Patent: Oct. 9, 2007

(54) TERMINAL APPARATUS AND CONTROLLING METHOD FOR OPTICAL OUTPUT POWER

(75) Inventors: Katsuji Yamaguchi, Kawasaki (JP); Kenichi Shinmura, Kawasaki (JP); Masato Nagayama, Kawasaki (JP); Tadayuki Takada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 10/893,410

(22) Filed: Jul. 19, 2004

(65) Prior Publication Data
US 2005/0207754 A1   Sep. 22, 2005

(30) Foreign Application Priority Data
Mar. 17, 2004   (JP)   ............................. 2004-075913

(51) Int. Cl.
*H04B 10/20* (2006.01)
*H04J 14/02* (2006.01)

(52) U.S. Cl. ........................... 398/94; 398/91; 398/97; 398/37

(58) Field of Classification Search .................. 398/38, 398/91–92, 94, 97
See application file for complete search history.

(56) References Cited

U.S. PATENT DOCUMENTS

| 6,108,123 A | * | 8/2000 | Kinoshita ................... 359/337 |
| 6,275,313 B1 | * | 8/2001 | Denkin et al. ................. 398/9 |
| 7,092,638 B2 | * | 8/2006 | Funami et al. .............. 398/158 |
| 2002/0048062 A1 | | 4/2002 | Sakamoto et al. .......... 359/124 |

FOREIGN PATENT DOCUMENTS

JP   2002-57624   2/2002

\* cited by examiner

*Primary Examiner*—Leslie Pascal
(74) *Attorney, Agent, or Firm*—Staas & Halsey LLP

(57) ABSTRACT

A terminal apparatus by which, even where BER data, for example, of an optical signal of an existing wavelength cannot be utilized, the optical output powers of the existing wavelength and an extension wavelength can be adjusted in a short period of time while eliminating quality degradation of the existing circuit. The terminal apparatus includes a level controlling section for controlling a total optical output power of an existing wavelength signal light and an extension wavelength signal light to a fixed level, a monitoring unit capable of monitoring the optical output power for each wavelength, and a controller for controlling the optical output power of the extension wavelength signal light so that the optical output power of the existing wavelength signal light monitored by the monitoring unit may not be lower than a minimum permissible optical output power.

8 Claims, 5 Drawing Sheets

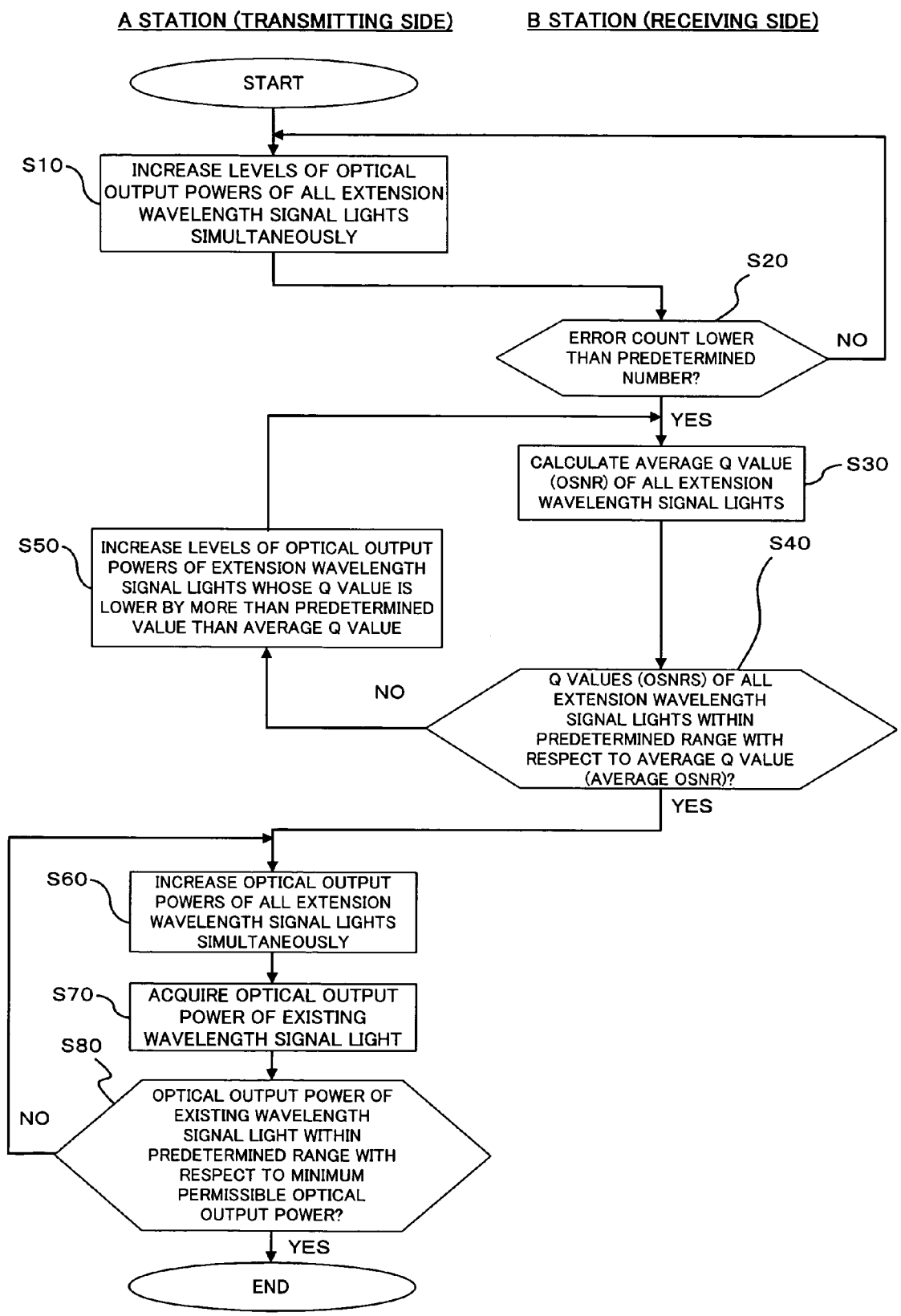

TERMINAL APPARATUS AND CONTROLLING METHOD FOR OPTICAL OUTPUT POWER

CROSS REFERENCE TO RELATED APPLICATIONS

This application is based on and hereby claims priority to Japanese Application No. 2004-75913 filed on Mar. 17, 2004 in Japan, the contents of which are hereby incorporated by reference.

BACKGROUND OF THE INVENTION

1) Field of the Invention

The present invention relates to a terminal apparatus, a controlling method for optical output power and a computer-readable storage medium having an optical output power controlling program stored thereon, suitable for use where a wavelength is newly extended in an existing optical transmission system such as, for example, an optical submarine cable system which utilizes an optical amplification submarine repeater.

2) Description of the Related Art

In recent years, extension of a new wavelength is carried out for an existing optical transmission system such as, for example, an optical submarine cable system utilizing a wavelength division multiplexing (hereinafter referred to as WDM) method.

In order to extend a new wavelength, it is necessary to adjust the optical output power (optical transmission power) of an optical signal having a wavelength to be newly extended.

In this instance, in the WDM optical transmission system, where a code error correction (Forward Error Correction; hereinafter referred to as FEC) processing section is provided on the receiving side, it is generally the case that a code error rate (Bit Error Rate; hereinafter referred to as BER) is calculated for each of wavelengths based on an error count counted by the FEC processing section and results of the calculation are fed back to the transmitting side so that the optical output powers of the wavelengths are individually adjusted on the transmitting side (refer to, for example, Japanese Patent Laid-Open No. 2002-57624). Such control of the optical output powers as just described is called pre-emphasis (hereinafter referred to as PE) control.

SUMMARY OF THE INVENTION

However, while the PE controls utilizes the BER as described above, when it is tried to extend a new wavelength in an existing optical transmission system, BER data of the optical signals of the existing wavelength cannot sometimes be utilized because of a difference in the monitoring method for the existing system, a difference in the interface and so forth.

Further, where the existing system and the newly extended apparatus are supplied from different suppliers, control of the optical output power for the optical signal of the existing wavelength cannot be executed.

Therefore, when it is tried to extend a new wavelength while an existing system is operating, the influence upon the existing wavelength is monitored by the manpower on an existing monitoring apparatus (On-Call base) and the PE control for the newly extended wavelength is performed manually.

Where such manual PE control is used, it is difficult to eliminate occurrence of quality degradation of the existing circuit (optical signal of the existing wavelength) because of an error in adjustment. Further, time is required for the adjustment.

It is an object of the present invention to provide a terminal apparatus, a controlling method for optical output power and a computer-readable storage medium having an optical output power controlling program stored thereon by which, even where BER data, for example, of an optical signal of an existing wavelength cannot be utilized, the optical output powers of the existing wavelength and an extension wavelength can be adjusted in a short period of time while eliminating quality degradation of the existing circuit.

In order to attain the object described above, according to an aspect of the present invention, there is provided a terminal apparatus for performing wavelength extension for an existing optical transmission system, comprising a level controlling section for controlling a total optical output power of an existing wavelength signal light and an extension wavelength signal light to a fixed level, a monitoring unit capable of monitoring an optical output power for each wavelength, and a controller for controlling an optical output power of the extension wavelength signal light so that the optical output power of the existing wavelength signal light monitored by the monitoring unit may not be lower than a minimum permissible optical output power.

Preferably, the terminal apparatus is connected to the existing optical transmission system through a coupler.

Preferably, the controller includes a relative level adjustment section for adjusting, where a plurality of signal lights individually having different wavelengths are to be extended, a relative level of the optical output power of each of the extension wavelength signal lights based on a Q value or an OSNR of signal light received by a terminal apparatus on the receiving side, and an absolute level adjustment section for increasing the levels of the optical output powers of the extension wavelength signal lights at the same time while the relative level differences between the optical output powers of the extension wavelength signal lights are maintained to adjust the absolute levels of the existing wavelength signal light and the extension wavelength signal lights.

Particularly preferably, the relative level adjustment section adjusts the relative levels of the optical output powers of the extension wavelength signal lights so that Q values of all of the extension wavelength optical signals are included within a predetermined range from an average Q value or OSNRs of all of the extension wavelength optical signals are within a predetermined range from an average OSNR.

Preferably, the absolute level adjustment section increases the levels of the optical output powers of the extension wavelength signal lights at the same time to adjust the absolute levels of the existing wavelength signal light and the extension wavelength signal lights so that the optical output power of the existing wavelength signal light is included within a predetermined range from the minimum permissible optical output power.

Preferably, the controller outputs an alarm signal when the optical output power of the existing wavelength signal light becomes lower than the minimum permissible optical output power.

According to another aspect of the present invention, there is provided a controlling method for optical output power for being executed by an extension system having a function for controlling, when a plurality of signal lights individually having different wavelengths are to be extended for an existing optical transmission system, a total optical output power of an existing wavelength signal light and extension wavelength signal lights to a fixed level, comprising a relative level adjustment step of adjusting relative levels of the optical output powers of the extension wavelength signal lights based on Q values or OSNRs of signal lights received by a terminal apparatus on the receiving side included in the extension system, and an absolute level adjustment step of increasing the levels of the optical output powers of the extension wavelength signal lights at the same time while the relative level differences of the optical output powers of the extension wavelength signal lights is maintained so that the optical output power of the light signals of the existing optical transmission system may not become lower than a minimum permissible optical output power to adjust the absolute levels of the existing wavelength signal light and the extension wavelength signal lights.

According to a further aspect of the present invention, there is provided a computer-readable storage medium which stores an optical output power controlling program for causing, when a plurality of signal lights individually having different wavelengths are to be extended for an existing optical transmission system, a computer provided for an extension system having a function for controlling a total optical output power of an existing wavelength signal light and extension wavelength signal lights to a fixed level to execute a level adjustment process of the optical output power, the level adjustment process comprising a relative level adjustment step of adjusting relative levels of the optical output powers of the extension wavelength signal lights based on Q values or OSNRs of signal lights received by a terminal apparatus on the receiving side included in the extension system, and an absolute level adjustment step of increasing the levels of the optical output powers of the extension wavelength signal lights at the same time while the relative level differences of the optical output powers of the extension wavelength signal lights is maintained so that the optical output power of the light signals of the existing optical transmission system may not become lower than a minimum permissible optical output power to adjust the absolute levels of the existing wavelength signal light and the extension wavelength signal lights.

According to a further aspect of the present invention, there is provided an optical output power controlling program for causing, when a plurality of signal lights individually having different wavelengths are to be extended for an existing optical transmission system, a computer provided for an extension system having a function for controlling a total optical output power of an existing wavelength signal light and extension wavelength signal lights to a fixed level to execute a level adjustment process of the optical output power, the level adjustment process comprising a relative level adjustment step of adjusting relative levels of the optical output powers of the extension wavelength signal lights based on Q values or OSNRs of signal lights received by a terminal apparatus on the receiving side included in the extension system, and an absolute level adjustment step of increasing the levels of the optical output powers of the extension wavelength signal lights at the same time while the relative level differences of the optical output powers of the extension wavelength signal lights is maintained so that the optical output power of the light signals of the existing optical transmission system may not become lower than a minimum permissible optical output power to adjust the absolute levels of the existing wavelength signal light and the extension wavelength signal lights.

With the terminal apparatus, controlling method for optical output power and computer-readable recording medium, there is an advantage that the optical output powers of the optical signals of the existing wavelength and the extension wavelengths can be adjusted in a short period of time while quality degradation of the existing line is prevented. Further, there is another advantage that, particularly even where BER data of the optical signal of the existing wavelength cannot be utilized or where suppliers of the existing line and extension lines are different from each other, the optical output powers of the optical signals of the existing wavelength and the extension wavelengths can be adjusted.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 1(A) and 1(B) are schematic views illustrating extension of a terminal apparatus according to an embodiment of the present invention to an existing optical transmission system, and wherein FIG. 1(A) shows the terminal apparatus in a state before wavelength extension and FIG. 1(B) shows the terminal apparatus in a state after wavelength extension;

FIG. 3 is a flow chart illustrating a controlling method (pre-emphasis controlling procedure) for the optical output power according to the embodiment of the present invention;

FIGS. 4(A) and 4(B) are diagrammatic views illustrating level up adjustment of optical output powers of extension wavelength signal lights in the optical output power controlling method according to the embodiment of the present invention, and wherein FIG. 4(A) illustrates level up adjustment of the optical output powers of all of the extension wavelength signal lights and FIG. 4(B) illustrates relative level adjustment of the optical output powers of the individual extension wavelength signal lights.

DESCRIPTION OF THE PREFERRED EMBODIMENTS

In the following, a terminal apparatus, a controlling method for the optical output power and a computer-readable storage medium having an optical output power controlling program stored thereon according to an embodiment of the present invention are described with reference to the drawings.

The present embodiment described below is applied to a case wherein new wavelength extension is performed for an existing optical submarine cable system (optical transmission system) as an example.

Figure 1A:
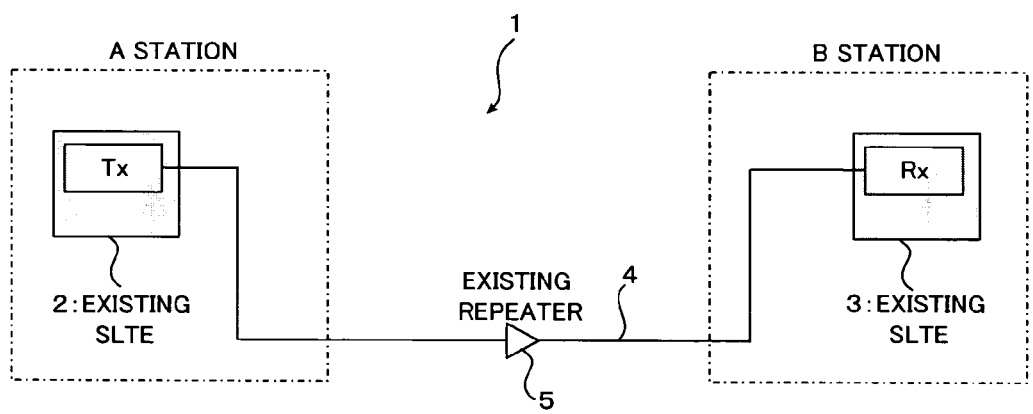
Figure 1B:
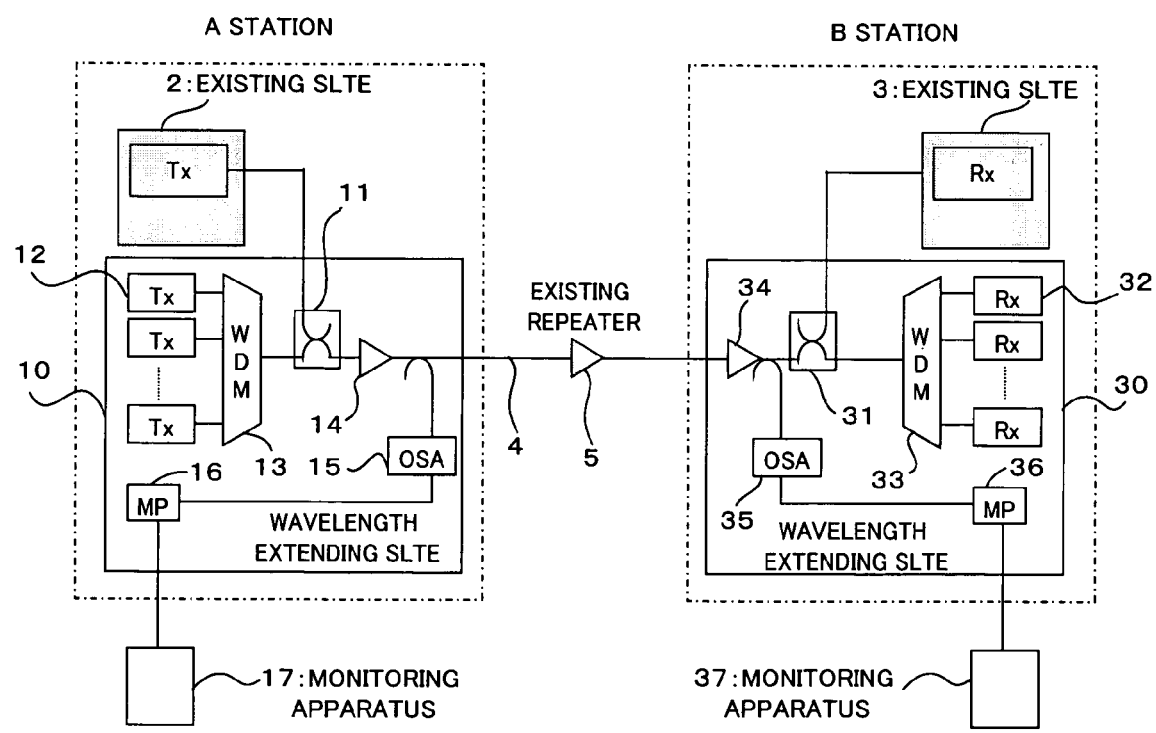

FIG. 1(A) shows a configuration of an existing optical submarine cable system, and FIG. 1(B) shows a configuration where new wavelength extension is performed for the existing optical submarine cable system of FIG. 1(A).

As shown in FIG. 1(A), in the existing optical submarine cable system (hereinafter referred to as existing system) 1, an A station as a terminal and a B station as another terminal include optical submarine terminal equipments (hereinafter referred to as existing SLTEs) 2 and 3, respectively. The existing SLTEs 2 and 3 are connected to each other through an optical transmission line 4. A repeater 5 is provided halfway of the optical transmission line 4. It is to be noted that, in FIG. 1(A), reference character Tx denotes an optical transmitter and Rx denotes an optical receiver.

In order to extend new wavelengths to a wavelength used in the existing system 1 having such a configuration as described above, in the present embodiment, wavelength extending SLTEs 10 and 30 are provided for the A and B stations and connected to the existing system 1 through 3-dB couplers (couplers) 11 and 31, respectively, as shown in FIG. 1(B). It is to be noted that the wavelength extending SLTEs 10 and 30 provided for wavelength extension are collectively called extension system.

It is to be noted that, in FIGS. 1(A) and 1(B), it is shown as an example that an extension system for transmitting and receiving signal light (WDM signal light) having a plurality of different wavelengths is extended for the existing system 1 which transmits and receives a signal light having a single wavelength. However, the extension of an extension system is not limited to the example just described, but, for example, an extension system for transmitting and receiving WDM signal light may be extended for an existing system which transmits and receives WDM signal light. Or, an extension system for transmitting and receiving signal light having a single wavelength may be extended for an existing system which transmits and receives WDM signal light, or else, an extension system for transmitting and receiving signal light having a single wavelength may be extended for an existing system which transmits and receives signal light having a single wavelength.

Here, the wavelength extending SLTE 10 provided in the A station is a transmitting terminal and includes a plurality of optical transmitters (Tx) 12 for individually transmitting a plurality of signal lights having different wavelengths, a WDM apparatus (multiplexer) 13 for performing a wavelength division multiplexing process (multiplexing process) for a plurality of signal lights having different wavelengths to produce wavelength division multiplexed signal light (WDM signal light), a 3-dB coupler 11 for coupling the signal light (extension wavelength signal light) from the WDM apparatus 13 and signal light (existing wavelength signal light) from the existing system 1, a WDM optical amplifier (here, an amplifier having an ALC (Auto Level Control) function) 14 provided at the following stage of the 3-dB coupler 11 for amplifying the existing wavelength signal light and the extension wavelength signal light, an optical spectrum analyzer (OSA, monitoring unit) 15 provided at the following stage of the 3-dB coupler 11 and the WDM optical amplifier 14 for monitoring the optical output powers (optical transmission powers) of the existing wavelength signal light and the extension wavelength signal light, and a monitoring control section (Maintenance Processor; MP, controller) 16. It is to be noted that the monitoring control section 16 is connected to a monitoring apparatus 17.

In the wavelength extending SLTE 10, the existing wavelength signal light and the extension wavelength signal light (a plurality of signal lights having different wavelengths) are coupled by the 3-dB coupler 11, and the total optical output power (total optical transmission power) $P_{OUT}$ of the existing wavelength signal light and the extension wavelength signal light is controlled to a fixed level by the WDM optical amplifier 14 with the ALC function.

In this manner, in the present embodiment, since the total optical output power (total optical transmission power) $P_{OUT}$ is fixed to a fixed value by the WDM optical amplifier 14 with the ALC function, if the optical output power of the extension wavelength signal light is adjusted, then the optical output power of the existing wavelength signal light can be indirectly adjusted.

Further, the optical output power of the signal lights coupled by the 3-dB coupler 11 is monitored for each of wavelengths by the optical spectrum analyzer 15 and the monitored information is transmitted to the monitoring control section 16 so that the optical output powers of the wavelengths are collected and monitored by the monitoring control section 16.

Further, in the wavelength extending SLTE 10, a minimum permissible optical output (transmission) power $[P(0)_{limit}]$ for the existing wavelength signal light can be set, and the monitoring control section 16 controls the optical output power of the extension wavelength signal light so that the optical output power of the existing wavelength signal light may not become lower than the minimum permissible optical output power. Further, if the optical output power of the existing wavelength signal light becomes lower than the minimum permissible optical output power, then the monitoring control section 16 outputs an alarm signal to the monitoring apparatus 17. Consequently, also when the optical output power of the existing wavelength signal light becomes lower than the minimum permissible optical output power by some cause during execution of an auto controlling process of the existing wavelength signal light, the monitoring apparatus 17 issues an alarm. Therefore, otherwise possible degradation of the quality of the existing line can be prevented with certainty.

It is to be noted that, while, for example, an amplifier (ALC AMP) with an ALC function (level control section) is used here as the WDM optical amplifier 14 to perform the control process (optical output power level control process) for fixedly maintaining the total optical output power $P_{OUT}$ of the existing wavelength signal light and the extension wavelength signal light, the present invention is not limited to the example just described, and the extension system should be configured in such a manner as to include at least a function (level control section; level controller) for fixedly maintaining the total optical output power $P_{OUT}$ of the existing wavelength signal light and the extension wavelength signal light. Also it is possible to perform the control process for fixedly maintaining the total optical output power $P_{OUT}$ of the existing wavelength signal light and the extension wavelength signal light using, for example, an optical attenuator (variable optical attenuator).

On the other hand, the wavelength extending SLTE 30 provided in the B station is a receiving terminal and includes a WDM optical amplifier 34 for amplifying signal light entering from the optical transmission line 4, a 3-dB coupler 31 for decoupling the signal light to the WDM apparatus 33 side and the existing system 1 side, a WDM apparatus (demultiplexer) 33 for demultiplexing the WDM signal light for each of bands, a plurality of optical receivers (Rx) 32 for individually receiving a plurality of signal lights having different wavelength, and a monitoring control section (Maintenance Processor; MP, controller) 36. It is to be noted that the monitoring control section 36 is connected to a monitoring apparatus 37.

It is to be noted that, here, while the existing wavelength signal light and the extension wavelength signal light are coupled and decoupled by the 3-dB couplers, the present invention is not limited to this. For example, a different coupler than the 3-dB coupler may alternatively be used for such coupling and decoupling as described above. Further, the 3-dB couplers described above may not be provided, but the existing system may be connected to the WDM apparatus 13 of the extension system such that the WDM apparatus 13 may multiplex and demultiplex the existing wavelength signal light and the extension wavelength signal light.

Further, though not shown in FIG. 1(B), also an opposing line is provided actually. Therefore, also a wavelength extending SLTE as a receiving terminal is provided for the A station and a wavelength extending SLTE as a transmitting terminal is provided for the B station.

Figure 2:
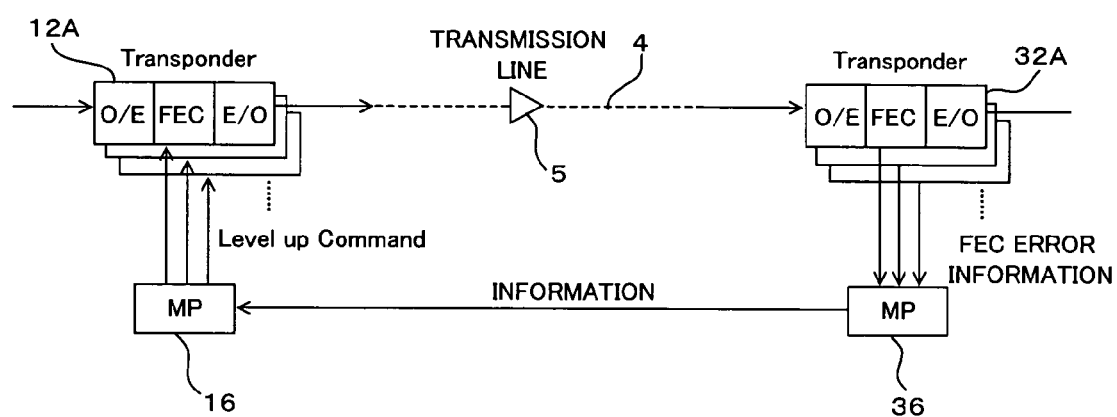
FIG. 2 is a diagrammatic view showing a configuration of the terminal apparatus according to the embodiment of the present invention.

Incidentally, as shown in FIG. 2, transponders 12A and 32A are provided in the plural optical transmitters 12 provided in the wavelength extending SLTE 10 of the A station and the plural optical receivers 32 provided in the wavelength extending SLTE of the B station, respectively.

Each of the transponders 12A and 32A includes an O/E processing section for performing an photo-electric conversion process, an FEC processing section for performing a forward error correction (hereinafter referred to as FEC) process, and an E/O processing section for performing an electro-photo conversion process. Further, the transponders 12A and 32A are individually connected to the monitoring control sections 16 and 36, respectively. Further, also the monitoring control sections 16 and 36 are connected to each other such that transmission and reception of information can be performed therebetween.

The FEC sections of the transponders 32A in the optical receivers 32 individually provided for the wavelengths in the wavelength extending SLTE 30 (receiving side) of the B station individually count errors in the individual wavelengths of the received signal light (reception light), and the counted error information (FEC error information) is transmitted to the monitoring control section 36. Thereafter, a code error rate (Bit Error Rate; hereinafter referred to as BER) is calculated for each wavelength based on the individual error count information by the monitoring control section 36, and then a Q value [Q(λ); Quality factor] is calculated for each wavelength based on the individual BER.

Here, the Q value is a signal to noise ratio of a digital signal where a noise signal is assumed as gauss noise and quantitatively indicates an influence on noise in the amplitude direction.

Generally, the Q value is given by an expression (1) given below. It is to be noted that µ represents the signal amplitude of the digital signal, σ the effective value of the noise amplitude, and 1 and 0 indicate that the signal is [high] and [low], respectively.

$$Q = \frac{|\mu 1 - \mu 0|}{\sigma 1 + \sigma 0} \quad (1)$$

The Q value [Q (λ)] for each wavelength calculated in such a manner as described above is fed back to the monitoring control section 16 provided in the wavelength extending SLTE 30 (transmitting side) of the A station. Then, the monitoring control section 16 transmits, based on the Q values [Q(λ)], commands to the transponders 12A of the optical transmitters 12 provided individually for the wavelengths so that adjustment of the optical output powers of the extension wavelength signal lights is performed.

Especially, in the present embodiment, the monitoring control section 16 first adjusts the relative levels of the optical output powers of the extension wavelength signal lights based on the Q values. Then, the monitoring control section 16 increases, while the relative level differences of the optical output powers of the extension wavelength signal lights are maintained, the levels of the optical output powers of the extension wavelength signal lights to adjust the absolute levels of the existing wavelength signal light and the extension wavelength signal lights. Details of the controlling method for the optical output power are hereinafter described.

It is to be noted that, while the adjustment of the optical output powers of the extension wavelength signal lights here is performed based on the Q values, the adjustment process is not limited to the example just described. For example, the adjustment process for each of the optical output powers of the extension wavelength signal light may be performed based on the SN ratio (Optical Signal-to-Noise Ratio; hereinafter referred to as OSNR) of the signal light (reception light) received by the wavelength extending SLTE 30 (receiving side) of the B station. It is to be noted that the Q value and the OSNR are parameters (optical signal quality parameters) which individually indicate the quality of an optical signal.

In this instance, as shown in FIG. 1(B), an optical spectrum analyzer (OSA, monitoring unit) 35 may be provided in the wavelength extending SLTE 30 (receiving side) of the B station such that the optical output power of signal light transmitted thereto through the optical transmission line 4 is monitored for each wavelength by the optical spectrum analyzer 35 and resulting information is transmitted to the monitoring control section 36 such that the monitoring control section 36 calculates the OSNR [OSNR (λ) ] for each wavelength in accordance with an expression (2) given below. Then, the OSNR [OSNR(λ) ] calculated for each wavelength is fed back to the monitoring control section 16 provided in the wavelength extending SLTE 30 (transmitting side) of the A station so that, based on the OSNRs [OSNR(λ)], the monitoring control section 16 may transmit commands to the transponders 12A of the optical transmitters 12 provided individually for the wavelengths to individually adjust the optical output powers of the extension wavelength signal lights.

$$OSNR = 10 \text{Log} \frac{\text{Signal}}{\text{Noise}} \quad (2)$$

Next, an optical output power controlling method (pre-emphasis controlling method) performed by the wavelength SLTEs 10 and 30 when the wavelength extending SLTEs 10 and 30 are extended for the existing system 1 is described with reference to FIGS. 3 to 5.

First, in the present embodiment, when it is tried to extend the wavelength extending SLTEs 10 and 30 for the existing system 1, the wavelength extending SLTE 10 (transmitting side) is connected to the existing system 1 provided in the A station through the 3-dB coupler 11, and the wavelength extending SLTE 30 (receiving side) is connected to the existing system 1 provided in the B station through the 3-dB coupler 31.

Further, the WDM optical amplifier 14 with the ACL function is provided at the following stage of the 3-dB coupler 11 provided in the wavelength extending SLTE 10 (transmitting side) of the A station. By the WDM optical amplifier 14, the total optical output power (total optical transmission power) $P_{OUT}$ of the signal light to be outputted to the optical transmission line (line) 4 is fixed, and, by the optical spectrum analyzer 15, the optical output power (optical transmission power) of the signal light to be outputted to the optical transmission line 4 is monitored for each wavelength.

It is to be noted that, in a state (initial state) wherein the wavelength extending SLTEs 10 and 30 (extension systems) are connected to the existing system 1 through the 3-dB coupler 31, since only the signal light from the existing system 1 is transmitted and received through the optical transmission line 4, only the optical output power of the signal light from the existing system 1 is monitored by the optical spectrum analyzer 15.

In such a state as just described, the monitoring control section 16 of the wavelength extending SLTE 10 (transmitting side) of the A station first transmits a level up command of the optical output power (optical transmission power) to all of the transponders 12A of the optical transmitters 12 (step S10) as seen in FIG. 3.

Figure 4A:
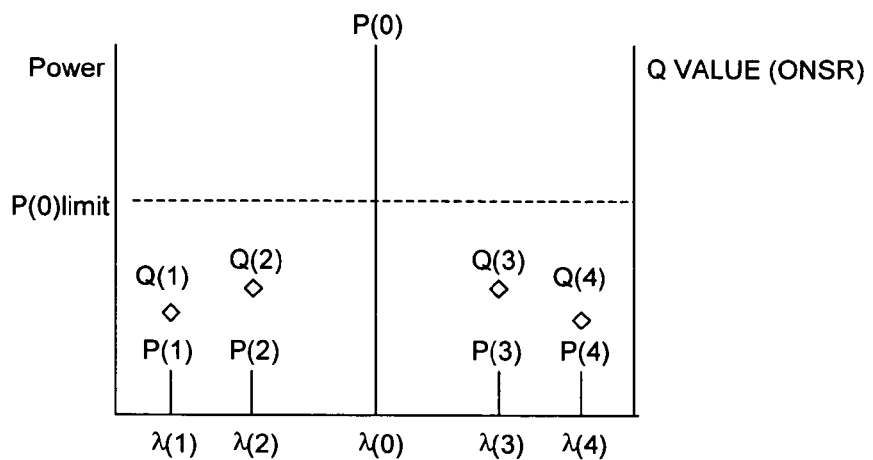

Then, since all of the transponders 12A of the optical transmitters 12 which have received the level up command individually perform the level up process of the optical output power, the levels of the optical output powers of the extension wavelength signal light are increased at the same time as seen in FIG. 4(A).

It is to be noted that, in FIG. 4(A), reference character P(0) denotes the optical output power of the existing wavelength signal light, and reference characters P(1) to P(4) denote each the optical output power of the extension wavelength signal light. Further, reference character $P(0)_{limit}$ denotes the minimum permissible optical output power of the existing wavelength signal light. Further, reference character λ(0) denotes the wavelength of the signal light used in the existing system, and reference characters λ(1) to λ(4) denote each the wavelength of the signal light used in the extension system. Further, reference characters Q(1) to Q(4) denote each the Q value of the extension wavelength signal light.

Thereafter, the monitoring control section 36 of the wavelength extending SLTE 30 (receiving side) of the B station acquires error count information (FEC error information) from the FEC processing sections of the transponders 32A of the optical receivers 32 provided individually for the wavelengths and determines whether or not the error count values (numbers of errors, corrected numbers of errors) are lower than a predetermined number (step S20).

Then, if it is determined that the error count values are not lower than the predetermined number (No route), then the monitoring control section 36 of the B station transmits information of the result of the determination to the monitoring control section 16 of the A station. The monitoring control section 16 performs the process at step S10 described above in response to the transmitted information. In particular, the levels of the optical output powers (output levels, transmission levels) of all of the extension wavelength signal lights are gradually (stepwise) increased until after the error count values become lower than the predetermined number.

On the other hand, if it is determined that the error count values are lower than the predetermined number (YES route), then the monitoring control section 36 of the B station calculates, based on the individual error count information transmitted from the FEC processing sections of the transponders 32A of the optical receivers 32 provided for the individual wavelengths, the bit error ratio (BER) for each wavelength, and calculates the Q value [Q(λ)] for each wavelength based on the calculated BER. Further, the monitoring control section 36 of the B station calculates, using an expression (3) given below, an average Q value [$Q_{ave}$] among all extension wavelength signal lights (reception lights) from the Q values [Q(λ)] calculated for the individual wavelengths (step S30).

$$Q_{ave} = \Sigma Q(\lambda)/N \quad (3)$$

where N is the number of wavelength to be extended.

Then, the monitoring control section 36 of the B station determines whether or not the Q values of all extension wavelength signal lights are within a predetermined range with respect to the average Q value. Here, the monitoring control section 36 of the B station determines whether or not the Q value [Q(λ)] of any extension wavelength signal light is lower by more than a predetermined value than the average Q value [$Q_{ave}$] [in particular, whether or not any Q value is lower than a value which is lower by a predetermined value α than the average Q value, $Q(\lambda) < Q_{ave} - \alpha$; α is a fixed value and is set for each system] (step S40).

Then, if it is decided that the Q value of any extension wavelength signal light is lower by more than the predetermined value than the average Q value (No route), then the monitoring control section 36 of the B station transmits information of the result of the determination and the Q values [Q(λ)] of the extension wavelength signal lights as well as the average Q value [$Q_{ave}$] of all extension wavelength signal lights to the monitoring control section 16 of the A station. The monitoring control section 16 transmits, in response to the transmitted information, a level up command of the optical output power to the transponder 12A of any optical transmitter 12 which transmits the extension wavelength signal light whose Q value has been determined lower by the more than predetermined value than the average Q value (step S50). Then, the transponder 12A of the optical transmitter 12 which receives the level up command performs the level up process of the optical output power. As a result, the level of the optical output power of any extension wavelength signal light whose Q value is lower by more than the predetermined value than the average Q value is increased.

It is to be noted that, in the present embodiment, the total optical output power $P_{OUT}$ is maintained fixed by the WDM optical amplifier 14 with the ALC function. Therefore, by performing such a level up control process as described above, also the optical output power of the extension wavelength signal light whose Q value is higher than the average Q value is automatically adjusted so that the Q value approaches the average Q value.

If the level of the optical output power of any extension wavelength signal light increases as just described, then the Q value of the extension wavelength signal light varies, and as a result, also the average Q value varies.

Therefore, after the level up process described above is performed, information representing this is transmitted from the A station to the B station, and the monitoring control section 36 of the B station performs the processes at steps S30 and S40 again. As a result, if it is determined that the Q value of any extension wavelength signal light is lower by the more than predetermined value than the average Q value (No route), then the level of the optical output power of the extension wavelength signal light whose Q value is lower by more than the predetermined value than the average Q value is increased (step S50) as described above.

Such processes at steps S30 to S50 as described above are repetitively performed until the Q values of all extension wavelength signal lights are within the predetermined range with respect to the average Q value. In particular, the processes at steps S30 to S50 are repetitively performed until the Q values of all extension wavelength signal lights are adjusted to a value higher than a value $[Q(\lambda) \geq Q_{ave} - \alpha]$ lower by more than the predetermined value a than the average Q value.

Figure 4B:
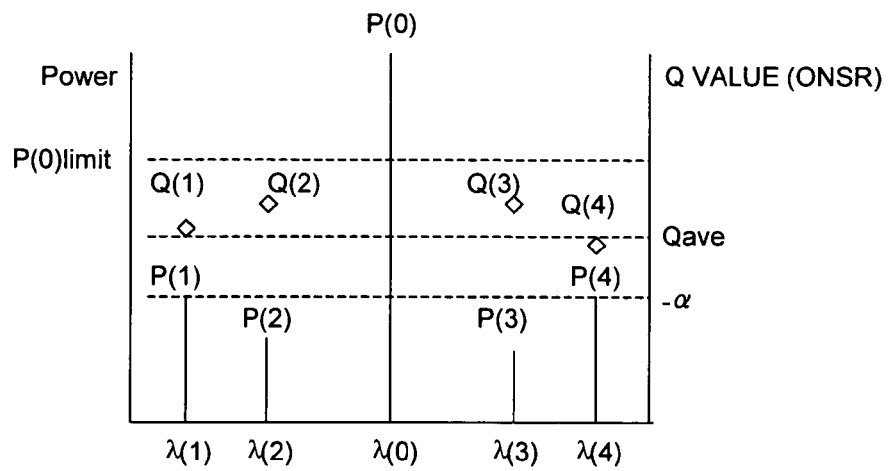

In this manner, in the present embodiment, the processes at steps S30 to S50 described above are repetitively performed to adjust the Q values of all extension wavelength signal lights until the Q values fall within the predetermined range with respect to the average Q value so that the dispersion in Q value between the extension wavelength signal lights is reduced as seen in FIG. 4(B) thereby to obtain a preferable transmission characteristic. Consequently, the optical output powers of the extension wavelength signal lights are adjusted to optimum optical output powers wherein the dispersion in Q value between the extension wavelength signal lights is suppressed to small, and the relative levels of the optical output powers of the extension wavelength signal lights are adjusted (relative level adjustment step). Therefore, a function for executing the processes at steps S30 to S50 is called relative level adjustment section. It is to be noted that this similarly applies also to a case wherein an adjustment process of the optical output power is performed based on an OSNR as hereinafter described.

In FIG. 4(B), reference character P(0) denotes the optical output power of the existing wavelength signal light, and reference characters P(1) to P(4) denote each the optical output power of an extension wavelength signal light. Reference character $P(\mathbf{0})_{limit}$ denotes the minimum permissible optical output power of the existing wavelength signal light. Reference character $\lambda(\mathbf{0})$ denotes the wavelength of the signal light used in the existing system, and reference characters $\lambda(\mathbf{1})$ to $\lambda(\mathbf{4})$ denote each the wavelength of a signal light used in the extension system. Reference characters Q(1) to Q(4) denote each the Q value of an extension wavelength signal light, and reference character $Q_{ave}$ denotes the average Q value. Reference character $\alpha$ denotes the predetermined value.

It is to be noted that, in the present embodiment, since the relative level adjustment process of the optical output power is performed based on the Q value, at steps S30 and S40, the monitoring control section 36 of the B station calculates the Q values [Q($\lambda$)] of the extension wavelength signal lights and the average Q value [$Q_{ave}$] of all extension wavelength signal lights based on the error count information from the FEC processing sections of the transponders 32A and determined whether or not the Q values of all extension wavelength signal lights are within the predetermined range with respect to the average Q value. However, the relative level adjustment process is not limited to the example just described.

For example, where the relative level adjustment process of the optical output power is performed based on the OSNR, the optical spectrum analyzer 35 may be provided separately such that, at step S30, the monitoring control section 36 of the B station calculates OSNRs [OSNR($\lambda$)] for the individual wavelengths based on the optical output powers of the extension wavelength signal lights monitored by the optical spectrum analyzer 35 and calculates an average OSNR [$OSNR_{ave}$] among all extension wavelength signal lights from the OSNRs [OSNR($\lambda$)] calculated for the individual wavelengths in accordance with the following expression (4):

$$OSNR_{ave} = \Sigma OSNR(\lambda)/N \quad (4)$$

where N is the number of wavelengths to be extended.

Further, at step S40, the monitoring control section 36 of the B station may determine whether or not the OSNRs of all extension wavelength signal lights are within a predetermined range with respect to the average OSNR. More particularly, the monitoring control section 36 of the B station may determine whether or not the OSNR [OSNR($\lambda$)] of any extension wavelength signal light is lower by more than a predetermined value than the average OSNR [$OSNR_{ave}$] [that is, whether or not any OSNR is lower than a value which is lower by a predetermined value $\beta$ than the average OSNR, OSNR($\lambda$)<$OSNR_{ave}-\beta$; $\beta$ is a fixed value and is set for each system].

Then, if it is determined that the OSNR of any extension wavelength signal light is lower by more than the predetermined value than the average OSNR (No route), then the monitoring control section 36 of the B station may transmit information representing this and the OSNRs of the extension wavelength signal lights as well as the average OSNR of all extension wavelength signal lights to the monitoring control section 16 of the A station so that, in response to the transmitted information, the monitoring control section 16 of the A station increases the level of the optical output power of any extension wavelength signal light whose OSNR is lower by more than the predetermined value than the average OSNR.

Incidentally, if it is determined that the Q values [Q($\lambda$)] of all extension wavelength signal lights are within the predetermined range with respect to the average Q value [$Q_{ave}$] [here, if it is discriminated that the Q values of all extension wavelength signal lights are higher than a value lower by a predetermined value than the average Q value; Q($\lambda$)$\geq$Qave–$\alpha$] (Yes route), then the monitoring control section 36 of the B station transmits information representing this to the monitoring control section 16 of the A station. In response to this, the monitoring control section 16 of the A station transmits, in order to increase the optical output powers of all extension wavelength signal lights at the same time, level up commands to the transponders 12A of the optical transmitters 12 of the A station. In response to this, the transponders 12A perform the level up process for the optical output powers. Consequently, the levels of the optical output powers of all extension wavelength signal lights are increased as seen in FIGS. 5(A) and 5(B) (step S60).

If the levels of the optical output powers of all extension wavelength signal lights are increased in this manner, then in the present embodiment, the total optical output power [$P_{OUT}$] is maintained fixed by the WDM optical amplifier 14 with the ALC function [$P_{OUT}$=P(0)+P(1)+P(2) ... P(n)= Constant]. Therefore, the optical output power of the existing wavelength signal light decreases relatively as seen in FIGS. 5(A) and 5(B).

Figure 5A:
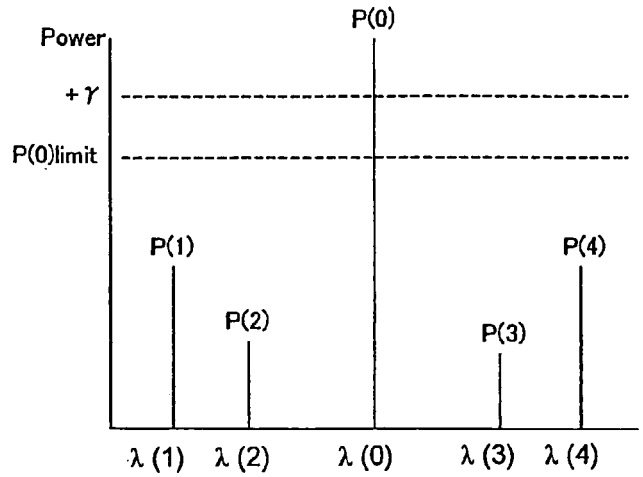
FIGS. 5(A) and 5(B) are diagrammatic views illustrating absolute level adjustment of the optical output powers of the extension wavelength signal lights and existing wavelength signal light in the controlling method for the optical output power according to the embodiment of the present invention.
Figure 5B:
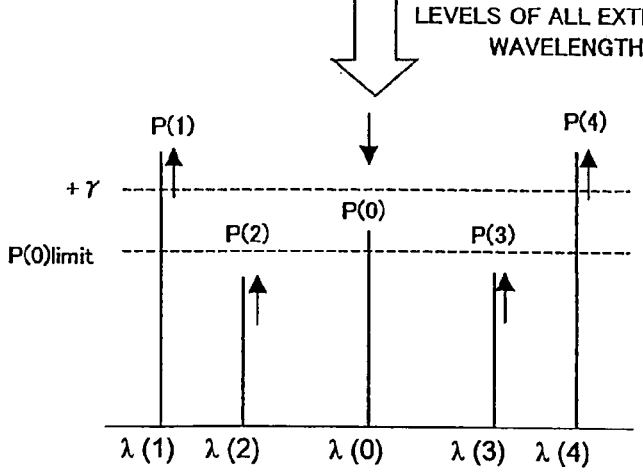

It is to be noted that, in FIGS. 5(A) and 5(B), reference character P(0) denotes the optical output power of the existing wavelength signal light, and reference characters P(1) to P(4) denote each the optical output power of an extension wavelength signal light. Further, reference character $\lambda(\mathbf{0})$ denotes the wavelength of the signal light used in the existing system, and reference characters $\lambda(\mathbf{1})$ to $\lambda(\mathbf{4})$ denote each the wavelength of a signal light used in the extension system. Further, $\gamma$ is a predetermined value.

In the present embodiment, since the optical output powers of all extension wavelength signal lights are increased at the same time by the level up control described above, as a result of the processes at steps S30 to S50 described above, the relative level differences appearing among the optical output powers of the extension wavelength signal lights are maintained. In particular, since the optical output powers of the extension wavelength signal lights are adjusted so that the Q values of all extension wavelength signal lights may fall within the predetermined range with respect to the average Q value by the processes at steps S30 to S50 described hereinabove to decrease the dispersion thereof, the relative level differences among the optical output powers of the extension wavelength signal lights are maintained by increasing the optical output powers of all extension wavelength signal lights at the same time.

After the level up process described above is executed, the monitoring control section 16 of the A station acquires the optical output power of the existing wavelength signal light from the optical spectrum analyzer 15 (step S70) and determines whether or not the optical output power [P(0)] of the existing wavelength signal light is within a predetermined range with respect to the minimum permissible optical output power $[P(0)_{limit}]$ [that is, whether or not the optical output power [P(0)] is lower than a value higher by a predetermined value γ than the minimum permissible optical output power, $P(0)<P(0)_{limit}+γ$] (step S80).

If a result of the determination proves that the optical output power [P(0)] of the existing wavelength signal light is not within the predetermined range with respect to the minimum permissible optical output power $[P(0)_{limit}]$ (NO route), then the monitoring control section 16 of the A station performs the processes at steps S60 to S80 described above again to increase the levels of the optical output powers of all extension wavelength signal lights at the same time and then acquires the optical output power of the existing wavelength signal light from the optical spectrum analyzer 15. Then, the monitoring control section 16 of the A station determinates whether or not the optical output power [P(0)] of the existing wavelength signal light is within the predetermined range with respect to the minimum permissible optical output power $[P(0)_{limit}]$.

Such processes at steps S60 to S80 as described above are repeated until after the optical output power [P(0)] of the existing wavelength signal light falls within the predetermined range with respect to the minimum permissible optical output power $[P(0)_{limit}]$. In other words, the processes at steps S60 to S80 are repeated until after the optical output power of the existing wavelength signal light becomes lower than the value higher by the predetermined value γ than the minimum permissible optical output power $[P(0)_{limit}]$. Consequently, the levels of the optical output powers (output levels, transmission levels) of all extension wavelength signal lights can be increased gradually (stepwise).

Then, if it is discriminated that the optical output power [P(0)] of the existing wavelength signal light is within the predetermined range with respect to the minimum permissible optical output power $[P(0)_{limit}]$ (YES route), then the processing is ended. Here, since the processing is ended when the optical output power [P(0)] of the existing wavelength signal light falls within the predetermined range with respect to the minimum permissible optical output power $[P(0)_{limit}]$, the optical output power of the existing wavelength signal light can be prevented from becoming lower than the minimum permissible optical output power thereby to prevent otherwise possible quality degradation in the existing circuit with certainty.

In this manner, in the present embodiment, by repeating the processes at steps S60 to S80 described hereinabove until the optical output power [P(0)] of the existing wavelength signal light becomes within the predetermined range with respect to the minimum permissible optical output power $[P(0)_{limit}]$, the absolute levels of the optical output powers of all extension wavelength signal lights are adjusted. Especially, in the present embodiment, since the total optical output power $[P_{OUT}]$ is controlled to a fixed level by the WDM optical amplifier 14 with the ALC function $[P_{OUT}=P(0)+P(1)+P(2)...P(n)=Constant]$, if only the absolute levels of the optical output powers of the extension wavelength signal lights in the extension system are adjusted, then also the absolute level of the optical output power of the existing wavelength signal light is adjusted simultaneously (absolute level adjustment step). Therefore, a function for executing the processes at steps S60 to S80 is called absolute level adjustment section.

It is to be noted that, while, in the embodiment described above, the processes at steps S20, S30 and S40 are executed by the monitoring control section 36 of the B station, they need not necessarily be executed by the monitoring control section 36 but may alternatively be executed by the monitoring control section 16 of the A station. In this instance, the monitoring control section 36 of the B station may transmit error count information acquired thereby to the monitoring control section 16 of the A station.

Further, while, in the embodiment described above, the process at step S80 is executed by the monitoring control section 16 of the A station, it need not necessarily executed by the monitoring control section 16 but may alternatively be executed by the monitoring control section 36 of the B station. In this instance, transmission and reception of information necessary to execute the process at step S80 must be performed between the monitoring control section 16 of the A station and the monitoring control section 36 of the B station.

Furthermore, while, in the present embodiment described above, the adjustment of the optical output powers of the extension wavelength signal lights and the existing wavelength signal light described above is performed where the wavelength extending SLTE 10 provided in the A station serves as the transmitting side and the wavelength extending SLTE 30 provided in the B station serves as the receiving side, also with regard to the opposing line where the wavelength extending SLTE 10 provided in the A station serves as the receiving side and the wavelength extending SLTE 30 provided in the B station serves as the transmitting side, the adjustment of optical output powers of extension wavelength signal lights and an existing wavelength signal light is performed by a similar method.

Accordingly, the terminal apparatus and the controlling method for the optical output power according to the present embodiment are advantageous in that the optical output powers of optical signals of an existing wavelength and extension wavelengths can be adjusted in a short period of time while eliminating quality degradation of the existing line. There is another advantage that, particularly even where BER data of the optical signal of the existing wavelength cannot be utilized or where suppliers of the existing line and extension lines are different from each other, the optical output powers of the optical signals of the existing wavelength and the extension wavelengths can be adjusted.

Incidentally, while, in the embodiment described above, the present invention is applied to the extension system including the wavelength extending SLTEs 10 and 30 and the controlling method for the optical output power executed in the extension system, a program (optical output power controlling program) for implementing such an extension system (wavelength extending SLTE) as just described can be stored on or in a computer-readable recording medium and can be distributed or sold on the market while it is in a state stored in the recording medium.

Since an extension system (wavelength extending SLTE) described hereinabove in the description of the embodiment can be implemented if the optical output power controlling program stored in such a recording medium as described above is installed into and executed by a computer, similar advantages to those achieved by the extension system (wavelength extending SLTE) described above can be achieved by the optical output power controlling program stored in the recording medium.

For the recording medium described above, any recording medium which can record a program thereon may be used including, for example, a memory such as a semiconductor memory, an optical disk (such as, for example, a CD-ROM), a magneto-optical disk (MO), a magnetic tape, a hard disk, a flexible disk, an IC card, a ROM cartridge, a punched card, an internal storage device of a computer (memory such as a RAM or a ROM) and an external storage device. Also various computer-readable media such as printed matters on which codes such as bar codes are printed can be utilized. It is to be noted that a CD-ROM, an MO, a magnetic tape, an IC card and so forth are called portable recording media.

It is to be noted that, while the optical output power controlling program is stored in a computer-readable recording medium, it need not necessarily be stored in a recording medium. Further, the optical output power controlling program may be transmitted (transmitted and received), for example, through a network as a transmission medium without being stored in such a recording medium as described above. This makes it possible to distribute or sell the optical output power controlling program on the market. For example, it is possible to upload the optical output power controlling program to a web server or the like or download the optical output power controlling program, for example, from a web server or the like through a network such as the Internet.

The present invention is not limited to the embodiment specifically described above, and variations and modifications can be made without departing from the scope of the present invention.

What is claimed is:

1. A terminal apparatus for performing wavelength extension for an existing optical transmission system, comprising:
   a level controlling section for controlling a total optical output power of an existing wavelength signal light and an extension wavelength signal light to a fixed level;
   a monitoring unit capable of monitoring an optical output power for each wavelength; and
   a controller for controlling an optical output power of the extension wavelength signal light so that the optical output power of the existing wavelength signal light monitored by said monitoring unit may not be lower than a minimum permissible optical output power.

2. The terminal apparatus as claimed in claim 1, wherein said terminal apparatus is connected to the existing optical transmission system through a coupler.

3. The terminal apparatus as claimed in claim 1, wherein said controller includes:
   a relative level adjustment section for adjusting, where a plurality of signal lights individually having different wavelengths are to be extended, a relative level of the optical output power of each of the extension wavelength signal lights based on a Q value or an OSNR of signal light received by a terminal apparatus on the receiving side; and
   an absolute level adjustment section for increasing the levels of the optical output powers of the extension wavelength signal lights at the same time while the relative level differences between the optical output powers of the extension wavelength signal lights are maintained to adjust the absolute levels of the existing wavelength signal light and the extension wavelength signal lights.

4. The terminal apparatus as claimed in claim 3, wherein said relative level adjustment section adjusts the relative levels of the optical output powers of the extension wavelength signal lights so that Q values of all of the extension wavelength optical signals are included within a predetermined range from an average Q value or OSNRs of all of the extension wavelength optical signals are within a predetermined range from an average OSNR.

5. The terminal apparatus as claimed in claim 3, wherein said absolute level adjustment section increases the levels of the optical output powers of the extension wavelength signal lights at the same time to adjust the absolute levels of the existing wavelength signal light and the extension wavelength signal lights so that the optical output power of the existing wavelength signal light is included within a predetermined range from the minimum permissible optical output power.

6. The terminal apparatus as claimed in claim 1, wherein said controller outputs an alarm signal when the optical output power of the existing wavelength signal light becomes lower than the minimum permissible optical output power.

7. A controlling method for optical output power for being executed by an extension system having a function for controlling, when a plurality of signal lights individually having different wavelengths are to be extended for an existing optical transmission system, a total optical output power of an existing wavelength signal light and extension wavelength signal lights to a fixed level, comprising:
   a relative level adjustment step of adjusting relative levels of the optical output powers of the extension wavelength signal lights based on Q values or OSNRs of signal lights received by a terminal apparatus on the receiving side included in the extension system; and
   an absolute level adjustment step of increasing the levels of the optical output powers of the extension wavelength signal lights at the same time while the relative level differences of the optical output powers of the extension wavelength signal lights is maintained so that the optical output power of the light signals of the existing optical transmission system may not become lower than a minimum permissible optical output power to adjust the absolute levels of the existing wavelength signal light and the extension wavelength signal lights.

8. A computer-readable storage medium which stores an optical output power controlling program for causing, when a plurality of signal lights individually having different wavelengths are to be extended for an existing optical transmission system, a computer provided for an extension system having a function for controlling a total optical output power of an existing wavelength signal light and extension wavelength signal lights to a fixed level to execute a level adjustment process of the optical output power, the level adjustment process comprising:
  a relative level adjustment step of adjusting relative levels of the optical output powers of the extension wavelength signal lights based on Q values or OSNRs of signal lights received by a terminal apparatus on the receiving side included in the extension system; and
  an absolute level adjustment step of increasing the levels of the optical output powers of the extension wavelength signal lights at the same time while the relative level differences of the optical output powers of the extension wavelength signal lights is maintained so that the optical output power of the light signals of the existing optical transmission system may not become lower than a minimum permissible optical output power to adjust the absolute levels of the existing wavelength signal light and the extension wavelength signal lights.

* * * * *